Patented Nov. 18, 1924.

UNITED STATES PATENT OFFICE.

ELOI RICARD, OF MELLE, FRANCE, ASSIGNOR TO SOCIÉTÉ RICARD, ALLENET & CIE., OF MELLE, DEUX-SEVRES, FRANCE.

PROCESS FOR PURIFYING LIQUIDS.

No Drawing.   Application filed December 24, 1921. Serial No. 524,763.

*To all whom it may concern:*

Be it known that I, ELOI RICARD, a citizen of France, and a resident of Melle, Deux-Sevres, France, have invented new and useful Improvements in Processes for Purifying Liquids, which is fully set forth in the following specification.

The present invention has for its object a process of purifying liquids of various kinds, which consists in adding first a suitable quantity of a soluble alginate to the liquid, then a suitable acid, base or easily decompoundable salt, so as to form a coagulating and clarifying precipitate of alginic acid or an insoluble alginate in the mass of the liquid, which when separated from the liquid constitutes a filter cake having alimentary or fertilizing properties.

This process may be particularly applied to the purification of the saccharine juices or liquid.

It is known that in the ordinary saccharine fabrication, the juice obtained by diffusion, pressure or other means of extraction from the raw material used, is purified for the purpose of removing the greater part of the impurities called generally "non-sugar"

The purification process universally used consists in causing lime and carbon dioxide to act on the juice once or several times at raised temperature.

For example, for the purification of the juice from beetroot the operation is generally as follows:—

To 1 hectolitre of beet juice (extracted by diffusion) heated to about 80° C., there is added milk of lime corresponding with 2–2. kilos of CaO. A stream of carbon dioxide is then passed through the mass, in order to saturate a part of the alkali.

As a result of the physical and chemical actions of the substances present, there forms a heavy precipitate. The mass is filtered under a pressure of 2 to 3 kg. per square centimeter, there being obtained, on the one hand, clear juice partially purified and, on the other hand, a residue containing the impurities of the beet mixed with a large quantity of calcium carbonate. This operation constitutes the first carbonatation.

To 1 hectolitre of juice thus obtained there is again added milk of lime corresponding with 0.2–0.4 kilos of CaO. A stream of carbon dioxide is passed through the mass, in order to saturate the alkali as exactly as possible and the whole is then heated to boiling. There forms a precipitate, the mass is again filtered, there being obtained, on the one hand, clear juice more nearly purified and, on the other hand, a residue containing for the greater part calcium carbonate. This operation constitutes the second carbonatation.

The second carbonatation is sometimes followed by a third, effected under the same conditions.

By starting with a juice of 88° of purity (88 per cent of sugar in the dry extract) there is obtained an approximate purity of 92° to 92.5°.

By the present invention saccharine juices or liquids are purified more simply and more completely by adding to the juice or liquid to be purified a suitable quantity of a soluble alginate, thus producing in the juice, at any suitable temperature (15° to 80° C.), a small quantity of insoluble alginic acid or alginate forming a coagulating and clarifying agent of considerable efficacy.

Alginic acid is one of the constituents of a large number of seaweeds, from which it has been extracted industrially for some years in the form of a soluble alginate (of soda, potash, ammonia, etc). These alginates_____dissolve to form a "hydrosol." When this hydrosol is treated with an acid, there is produced insoluble alginic acid; when it is treated with lime there is formed insoluble calcium alginate.

The following examples illustrate the invention:—

First example: To 1 hectolitre of beet juice extracted by diffusion there is added a quantity of hydrosol corresponding to 100 to 150 grams of pure alginate. The mass is stirred for some minutes to make it homogeneous; 200–250 grams of CaO in the form of milk of lime are then added and the mixture is thoroughly agitated and left at rest for 20 to 25 minutes. There forms a coagulum rich in alginate of lime which includes and precipitates the greater part of the impurities. The mass is filtered under slight pressure (0.5–1 kilo) and there is obtained, on the one hand, a highly purified and clarified juice and, on the other hand, a cake composed in the main of the organic substances of the beet.

The juice obtained in this manner being slightly alkaline, is then neutralized by a stream of carbon dioxide.

If the original juice be of 88° of purity, there may be obtained by this treatment a juice of 93–94° purity, approximately. Filtration is more rapid than in the usual carbonatation purification. The reduction in the time of filtration varies from 20 to 50 per cent, according to the juice treated.

Second example: To 1 hectolitre of milk serum (the serum is the liquid remaining after the fat and casein have been removed from the milk; this liquid contains lactose and "non-sugar") there is added a quantity of hydrosol corresponding with 500 to 550 grams of pure alginate and the mass is stirred for some minutes in order to ensure homogeneity. There are then added 200 to 250 grams of sulphuric acid (or an equivalent quantity of another strong acid). The whole is shaken to ensure thorough mixture and left at rest for 20 to 25 minutes. There forms a coagulum of insoluble alginic acid which includes and precipitates the greater part of the impurities. The mass is filtered under slight pressure (0.3–0.5 kilos) there being obtained, on the one hand, a highly purified and clarified liquid and, on the other hand, a cake composed in the main of the organic substances of the serum.

The liquid obtained being slightly acid it is neutralized by a base.

Third example: To 1 hectolitre of apple juice (the juice of apples contains lævulose) there is added a quantity of hydrosol corresponding with 400 to 450 grams of pure alginate and the mass is stirred for some minutes in order to ensure homogeneity. 200 to 300 grams of phosphoric acid (or an equivalent quantity of another strong acid) are then added. The whole is shaken to ensure thorough mixture and is left at rest for 20 to 25 minutes. There forms a coagulum of insoluble alginic acid which includes and precipitates the greater part of the impurities. The mass is filtered under slight pressure (0.3–0.5 kilos), there being obtained, on the one hand, a highly purified and clarified juice and, on the other hand, a cake composed in the greater part of the organic substances of the apple juice. The juice obtained being slightly acid, it is neutralized by a base.

The cakes obtained by filtration of the juices as indicated above are composed of the alginic acid or alginate of lime used as coagulant and of the organic substances contained in the raw materials treated. Now, it is known that seaweeds which contain alginic acid constitute an animal foodstuff of great value, as has been demonstrated by the Commissary-General Adrian (Académie des Sciences, 7th January 1918), Lapicque and Brocq-Rousseau (Académie des Sciences, 28th June 1920), Sauvageau (Utilization des Algues, Octave Doin's Library, Paris). It follows that the cakes obtained should, a priori, constitute a good food for animals. When fed to horses, oxen, sheep and pigs, these cakes have been accepted immediately and have been consumed with avidity, as though they had been brewer's grains.

In carbonatation purification a small quantity of insoluble sugar is formed either by the action of the carbon dioxide or by the superheating of the juices or, finally, by an irregular operation:—the insoluble sugar sucro-carbonate of lime formed remains in the cake and is lost for manufacture. In the present process insoluble sugar is not formed, the causes of its production being eliminated.

The process may be applied to the purification of liquids of various kinds, as illustrated by the following examples:

Fourth example: To one hectolitre of tannin extract there is added a solution of an alginate containing 300 grams of pure alginate; the mixture is well stirred and there are added 50 grams of barium formate; thorough stirring then follows and the mixture is left at rest for some minutes. There is formed a precipitate of barium alginate which entrains the colloidal matters and the suspensoids contained in the extract.

The mass is filtered by any suitable means and there is obtained on the one hand an absolutely clear liquid, thoroughly purified and decolorized, which may be evaporated without becoming turbid and without deposit on the evaporator, and on the other hand a filter cake having a certain value as a manure.

The purification is the more complete the lower the temperature of the operation.

Fifth example: To 1 hectolitre of fermented beet-root juice is added a solution of an alginate containing 400 grams of pure alginate. The mass is well stirred and there are added 200 grams of sulphuric acid; after thorough agitation the whole is left at rest for some minutes. There is formed a precipitate of alginic acid which entrains the colloidal matters of the fermented juice as well as the yeast cells and the suspended pulp.

The whole is filtered by any suitable means whereby there is obtained a clarified juice which does not soil the distilling apparatus, and, on the other hand, a filter cake of considerable alimentary value.

Sixth example: To 1 hectolitre of washing water flowing from the strainer of the potato-starch factory there is added a solution of an alginate containing 200 grams of pure alginate; the mixture is well stirred and there are added 150 grams of lime (CaO) in the form of milk of lime, the mixture is thoroughly agitated and then left at rest for some minutes. There is formed a precipitate of calcium alginate which entrains the colloidal matters in the washing water, as well as the light starch in suspension. The whole is filtered by suitable means and there is obtained on the one hand purified and clarified water, no longer liable to putrefaction, and on the other hand a filter cake of high alimentary value.

In certain cases the liquids to be purified contain in solution, among the impurities to be eliminated, acids, bases or inorganic or organic salts capable of forming with the soluble alginate used an insoluble precipitate of alginic acid or alginate having a coagulating effect.

These combinations or double decompositions constitute a chemical purification of a character different from that which precedes.

Seventh example: To 1 hectolitre of wine brandy, soiled by contact with an iron receptacle and having acquired an opalescent tinge and a disagreeable taste, there is added a solution of a soluble alginate corresponding with 70 grams of pure alginate; the mixture is well stirred and allowed to rest for some minutes. There is formed a precipitate of iron alginate which is filtered in order to obtain a perfectly clear liquid.

If the filtered liquid contains a small quantity of soluble alginate, there is added a corresponding quantity of lime (30-50 grams) and the mixture is thoroughly agitated. Insoluble calcium alginate is formed and is filtered in order to obtain a brandy absolutely clear and completely regenerated.

The foregoing examples do not limit the invention, since the present process may be applied with suitable variations to various liquids.

Having now fully described the nature of the said invention and the best means I know of carrying the same into practical effect, I claim:

1. A process of purifying liquids of various kinds which consists in adding a water soluble alginate to the liquid, and means to precipitate alginic acid, so as to form a precipitate in the mass of the liquid.

2. A process of purifying liquids of various kinds which consists in adding a water soluble alginate to the liquid, and means to precipitate alginic acid, so as to form a coagulating and clarifying precipitate in the mass of the liquid.

3. A process for purifying saccharine juice or liquids consisting in adding a water soluble alginate to the mass to be purified, then adding an acid thereby displacing the alginic acid in order to form a cogulating and clarifying precipitate of insoluble alginic acid in the mass to be purified, this process permitting rapid filtration at any suitable temperature.

4. In a process of purifying liquids of various kinds which consists in adding a water soluble alginate to the liquid and means to precipitate alginic acid so as to form a coagulating and clarifying precipitate, the separation from the liquid of this precipitate in order to obtain a filter cake having alimentary or fertilizing properties.

In testimony whereof I have signed this specification.

ELOI RICARD.